S. K. HAINES.
TRACE HOLDER.
APPLICATION FILED FEB. 2, 1917.
1,225,621.
Patented May 8, 1917.
FIG. 1
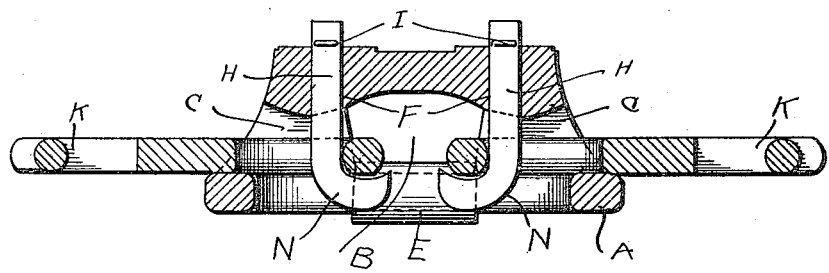
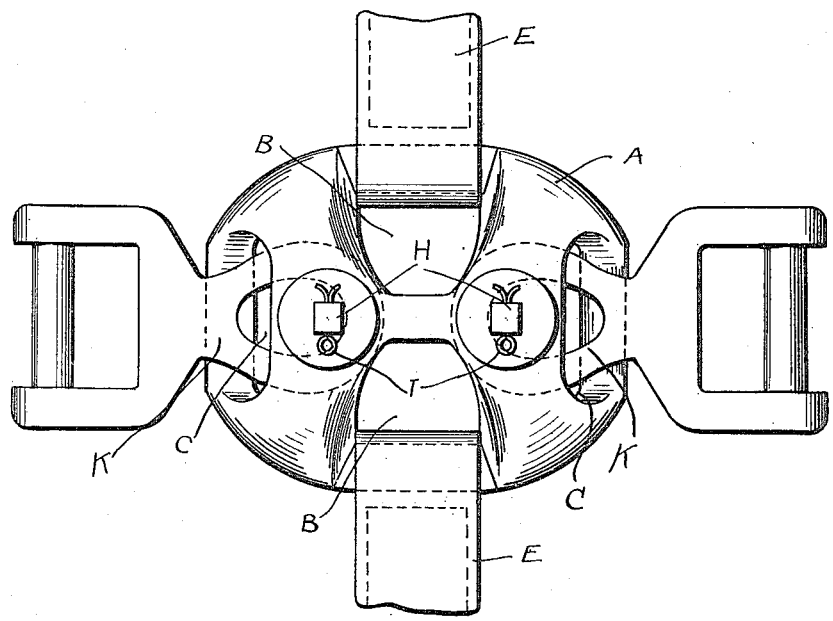
FIG. 2.
Inventor.
Samuel K. Haines
Attorney

UNITED STATES PATENT OFFICE.

SAMUEL K. HAINES, OF SHUBERT, NEBRASKA.

TRACE-HOLDER.

1,225,621.    Specification of Letters Patent.    Patented May 8, 1917.

Application filed February 2, 1917. Serial No. 146,162.

*To all whom it may concern:*

Be it known that I, SAMUEL K. HAINES, a citizen of the United States, residing at Shubert, in the county of Richardson and State of Nebraska, have invented certain new and useful Improvements in Trace-Holders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trace supports for harnesses and consists of a simple and efficient device of this nature adapted to be attached to the harness and positioned upon the back of the animal and carrying vertically movable hooks, designed to receive the ends of the cockeyes of traces.

The present invention comprises a device of this nature having various details of construction, combinations and arrangements of parts which will be hereinafter fully described, shown in the accompanying drawings and then specifically defined in the appended claim.

I illustrate my invention in the accompanying drawings, in which:—

Figure 1 is a central vertical sectional view through the device.

Fig. 2 is a top plan view.

Reference now being had to the details of the drawings by letter, A designates the skeleton frame of the device having openings B in the opposite ends thereof as well as lateral openings C. Said frame is held to the harness in the manner shown by the straps E and the top of the frame is provided with two openings rectangular in cross section, designated by letter F, and H designates hooks having square shank portions movable within said openings F and have stops I at their upper ends to support the hooks by said stops coming against the upper face of the frame.

The cockeye of the trace is designated by letter K and is adapted to be inserted through one of the openings C and to catch over one of said hooks, thereby affording means for holding up the end of the trace to which the cockeye is attached. When it is desired to release the cockeye from the hook, the cockeye is moved in a slight distance to free the same from the hook, after which the latter may be raised out of the path of the cockeye and the latter readily withdrawn without interference from the hook. When the hook is released, it will fall by gravity to its normal position, as shown in Fig. 1 of the drawings. It will be noted that the hooks have curved portions N against which the edge of the cockeye is adapted to contact, thus causing the hook to be elevated automatically when the cockeye is pushed into the frame, after which the hook will fall through the cockeye and automatically engage the latter.

What I claim to be new is:—

A trace holder comprising a skeleton frame adapted to be attached to the back strap of a harness and provided with opening at its ends, said frame having apertures rectangular in cross section, gravity hooks mounted in said apertures and arranged to extend across said openings, and having curved portions against which the end of a cockeye is adapted to contact to cause the hook to be elevated to permit the cockeye to pass by the hook, and means fastened to the ends of the hooks for limiting their downward movement.

In testimony whereof I hereunto affix my signature in presence of two witnesses.

SAMUEL K. HAINES.

Witnesses:
 W. D. EVANS,
 WILLIAM G. UTTERBACH.